United States Patent
Wind et al.

(10) Patent No.: US 8,337,586 B2
(45) Date of Patent: Dec. 25, 2012

(54) CROSSLINKED POLYIMIDE MEMBRANE, METHOD FOR MAKING THE SAME USING ORGANIC TITANATE CATALYSTS TO FACILITATE CROSSLINKING AND METHOD OF USING THE MEMBRANE FOR FLUID SEPARATION

(75) Inventors: John D. Wind, Berkeley, CA (US); Stephen J. Miller, San Francisco, CA (US); Oluwasijibomi O. Okeowo, Clayton, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 13/489,655

(22) Filed: Jun. 6, 2012

(65) Prior Publication Data
US 2012/0241996 A1    Sep. 27, 2012

Related U.S. Application Data

(62) Division of application No. 11/968,080, filed on Dec. 31, 2007, now Pat. No. 8,221,531.

(51) Int. Cl.
*B01D 53/22* (2006.01)

(52) U.S. Cl. ............... 95/45; 95/47; 95/51; 95/54; 96/4; 96/10

(58) Field of Classification Search ................. 95/43, 45, 95/47–54; 96/4, 10
See application file for complete search history.

(56) References Cited

U.S. PATENT DOCUMENTS

| | | |
|---|---|---|
| 3,567,632 A | 3/1971 | Richter et al. |
| 4,181,675 A | 1/1980 | Makin et al. |
| 4,230,463 A | 10/1980 | Henis et al. |
| 4,427,419 A | 1/1984 | Li |
| 4,474,858 A | 10/1984 | Makino et al. |
| 4,512,893 A | 4/1985 | Makino et al. |
| 4,690,873 A | 9/1987 | Makino et al. |
| 4,705,540 A | 11/1987 | Hayes |
| 4,717,393 A | 1/1988 | Hayes |
| 4,717,394 A | 1/1988 | Hayes |
| 4,728,345 A | 3/1988 | Murphy |
| 4,740,219 A | 4/1988 | Kulprathipanja et al. |
| 4,838,900 A | 6/1989 | Hayes |
| 4,857,079 A | 8/1989 | Kimura |
| 4,880,442 A | 11/1989 | Hayes |
| 4,925,459 A | 5/1990 | Rojey et al. |
| 4,932,986 A | 6/1990 | Kulkarni et al. |

(Continued)

OTHER PUBLICATIONS

K.C. O'Brien, W.J. Koros, T.A. Barbari, E.S. Sanders; A New Technique for the Measurement of Multicomponent Gas Transport Through Polymeric Films; Journal of Membrane Science; 1986; pp. 229-238; vol. 29; Elsevier Science Publishers B.V., Amsterdam, The Netherlands.

(Continued)

*Primary Examiner* — Jason M Greene
*Assistant Examiner* — Anthony Shumate
(74) *Attorney, Agent, or Firm* — Richard J. Schulte

(57) ABSTRACT

A method of making a crosslinked polyimide membrane is described. A monoesterified membrane is formed from a monoesterified polyimide polymer. The monoesterified membrane is subjected to transesterification conditions to form a crosslinked membrane. The monoesterified membrane is incorporated with an organic titanate catalyst before or after formation of the monoesterified membrane. A crosslinked polyimide membrane made using the aforementioned method and a method of using the membrane to separate fluids in a fluid mixture, such as methane and carbon dioxide, are also disclosed.

14 Claims, 3 Drawing Sheets

Monoesterification and Transesterification Reactions

U.S. PATENT DOCUMENTS

| | | | |
|---|---|---|---|
| 4,952,220 | A | 8/1990 | Langsam et al. |
| 5,071,452 | A * | 12/1991 | Avrillon et al. ............... 95/47 |
| 5,085,676 | A | 2/1992 | Ekiner et al. |
| 5,104,532 | A | 4/1992 | Thompson et al. |
| 5,286,280 | A | 2/1994 | Chiou |
| 5,288,304 | A | 2/1994 | Koros et al. |
| 5,310,415 | A | 5/1994 | Simmons et al. |
| 5,591,250 | A | 1/1997 | Stern et al. |
| 5,725,769 | A | 3/1998 | Miller et al. |
| 5,922,104 | A | 7/1999 | Park et al. |
| 5,928,410 | A | 7/1999 | Jois et al. |
| 5,969,087 | A | 10/1999 | Maeda |
| 5,972,080 | A | 10/1999 | Nagata |
| 6,168,649 | B1 | 1/2001 | Jensvold et al. |
| 6,383,258 | B1 | 5/2002 | Simmons |
| 6,464,755 | B2 | 10/2002 | Nakanishi et al. |
| 6,656,252 | B2 * | 12/2003 | Kita et al. ............... 96/4 |
| 6,755,900 | B2 | 6/2004 | Koros et al. |
| 6,899,744 | B2 * | 5/2005 | Mundschau ............... 95/56 |
| 6,932,859 | B2 | 8/2005 | Koros et al. |
| 7,247,191 | B2 | 7/2007 | Koros et al. |

OTHER PUBLICATIONS

Lora M. Costello, William J. Koros; Temperature Dependence of Gas Sorption and Transport Properties in Polymers: Measurement and Applications; Industrial and Engineering Chemistry Research; 1992; pp. 2708-2714; vol. 31; American Chemical Society.

A.Y. Houde, B. Krishnakumar, S.G. Charati, S.A. Stern; Permeability of Dense (Homogeneous) Cellulose Acetate Membranes to Methane, Carbon Dioxide, and their Mixtures at Elevated Pressures; Journal of Applied Polymer Science; 1996; pp. 2181-2192; vol. 62, Issue 13; John Wiley & Sons, Inc.

John D. Wind, Claudia Staudt-Bickel, Donald R. Paul, William J. Koros; Solid-State Covalent Cross-Linking of Polyimide Membranes for Carbon Dioxide Plasticization Reduction; Macromolecules; 2003; pp. 1882-1888; vol. 36; American Chemical Society.

John D. Wind, Stephen M. Sirard, Donald R. Paul, Peter F. Green, Keith P. Johnston, William J. Koros; Carbon Dioxide-Induced Plasticization of Polyimide Membranes: Pseudo-Equilibrium Relationships of Diffusion, Sorption, and Swelling; 2003; pp. 6433-6441; vol. 36; American Chemical Society.

David William Wallace; Crosslinked Hollow Fiber Membranes for Natural Gas Purification and their Manufacture from Novel Polymers; 2004; Ph,D. Dissertation, The University of Texas at Austin.

DuPont Tyzor® Organic Titanates an Zirconates, Effective Catalyst for Esterification and Transesterification Reactions, 2008.

DuPont Tyzor® Organic Titanates, Product Information—Tyzor TPT, 2001.

DuPont Tyzor® Organic Titanates an Zirconates, A Broad Line of Versatile, High-Quality Solutions for Enhancing Your Products' Performance, 2008.

DuPont Performance Chemicals , Tyzor® Organic Titanates and Zirconates, 1998.

DuPont Tyzor® Organic Titanates, Technical Note—Polyesterification Catalyst, 2001.

DuPont Tyzor® Organic Titanates, Product Information—Tyzor® PEL-F, 2001.

DuPont Tyzor® Organic Titanates, Product Information—Tyzor® LA, 2001.

DuPont Tyzor® Organic Titanates, Product Information—Tyzor® AA Chelates, 2001.

DuPont Tyzor® Organic Titanates, Technical Note—Crosslinking, 2001.

John Matthey Catalysts, VERTEC™—Trans Esterification Technology, 2003.

* cited by examiner

Monoesterification and Transesterification Reactions

Schematic of Gas Permeation Apparatus for Flat Membrane Films

CROSSLINKED POLYIMIDE MEMBRANE, METHOD FOR MAKING THE SAME USING ORGANIC TITANATE CATALYSTS TO FACILITATE CROSSLINKING AND METHOD OF USING THE MEMBRANE FOR FLUID SEPARATION

This application is a divisional of U.S. patent application Ser. No. 11/968,080 filed on Dec. 31, 2007, the contents of which are incorporated herein by reference. U.S. patent application Ser. No. 11/968,080 is now U.S. Pat. No. 8,221,531.

TECHNICAL FIELD

The present invention relates generally to methods for making membranes which are used to separate components in a fluid mixture, and more particularly, to crosslinked membranes which are made from crosslinkable polyimide polymers.

BACKGROUND

The application of membranes in gas separation and pervaporation requires materials that are resistant to plasticizing feed streams. Removal of carbon dioxide from high-pressure natural gas exemplifies this type of separation. Plasticization results in unstable membrane performance and a loss in separation efficiency (increased methane losses). Polyimides have been identified as suitable materials for gas separation and pervaporation applications. To further improve the resistance of these materials to plasticization, methods of making crosslinkable polyimide polymers have been devised.

For example, U.S. Pat. Nos. 7,247,191; 6,932,859; and 6,755,900, which documents are incorporated by reference herein in their entireties, teach crosslinkable polymers and crosslinked hollow fiber membranes made from such crosslinkable polymers. These patents particularly describe a crosslinkable polyimide polymer. The crosslinkable polyimide polymer can be made by monoesterifying a polyimide that contains pendant carboxylic acid groups with a muli-functional alcohol crosslinking agent (e.g. diols, triols).

A crosslinked membrane can be made by transesterifying the monoesterified polyimide. More specifically, the crosslinkable polyimide polymer can be formed into crosslinkable membranes, which are then subjected to transesterification conditions in order to create covalent ester crosslinks between polyimide chains. Such membranes can be hollow fiber membranes or other types of membranes. Crosslinked hollow fiber membranes can be incorporated into a separation module. Other types of membranes for separation include flat sheet separation membranes, which can be used to create spirally wound membrane modules or flat stack permeators.

As further exemplary references of how crosslinkable polyimide polymers and membranes may be made, see Wind J. D., C. Staudt-Bickel, D. R. Paul, W. J. Koros, Solid-state covalent crosslinking of polyimide membranes for carbon dioxide plasticization reduction, *Macromolecules*, 2003, 36, 1882-1888; and Wind, J. D., S. M. Sirard, D. R. Paul, P. F. Green, K. P. Johnston, W. J. Koros, $CO_2$-induced plasticization of polyimide membranes: Pseudo-equilibrium relationships between diffusion, sorption, and swelling, *Macromolecules*, 2003, 36, 6433-6441. These references are also incorporated by reference in their entireties.

A common attribute of these references is that they often provide for transesterification conditions wherein crosslinking occurs at relatively high temperatures, i.e., 200° C. or more. Alternatively, if lower temperatures are used, long periods of heating are required to achieve desired results in crosslinking For example, U.S. Pat. No. 6,932,859 provides that crosslinkable fibers are crosslinked at 150° C. for 25 hours. Commercially, requiring either high temperatures and/or long heating periods to cause crosslinking is undesirable.

It is known that the crosslinking or transesterification reactions can be acid-catalyzed. Incorporation of p-toluene sulfonic acid (p-TSA) into hollow fibers has been shown to lower the required temperature to make fibers insoluble in tetrahydrofuran (THF), a good solvent for the monoesterified polymer. See Wallace, D. W., Crosslinked hollow fiber membranes for natural gas purification and their manufacture from novel polymers, *Ph.D. Dissertation*, The University of Texas at Austin, 2004. However, the transport properties of these fibers were compromised by the inclusion of high concentrations of p-TSA (4 wt %).

Accordingly, there is a need to find methods for accommodating crosslinking at lower, more industrially-relevant temperatures and/or shorter heating times which do not compromise the separation capabilities of resulting crosslinked membranes. The present disclosure addresses this need.

SUMMARY

A method of making a crosslinked polyimide membrane is described. A monoesterified membrane is formed from a monoesterified polyimide polymer. The monoesterified membrane is subjected to transesterification conditions to form a crosslinked membrane. The forming of the monoesterified membrane includes imbibing an organic titanate catalyst into the monoesterified membrane.

In a first embodiment, the monoesterified polyimide membrane is cast into a film or spun into a hollow fiber and then the organic titanate catalyst is imbibed into the monoesterified polyimide membrane. This embodiment includes spinning the monoesterified polyimide polymer into a hollow fiber membrane. The hollow membrane is then immersed in a solution containing the organic titanate catalyst to imbibe the organic titanate catalyst in the membrane. The membrane is then heated for a period of time to crosslink the hollow fiber membrane.

In another embodiment, the monoesterified polyimide polymer and the organic titanate catalyst may be mixed together in a solvent solution and then the monoesterified membrane is formed from the solution. This method is effective for making membranes such as cast sheet membranes.

The monoesterified membrane, depending on the amount of crosslinkable sites in the selected polyimide polymer, the type and concentration of organic titanate catalyst imbibed into the monoesterified polyimide polymer, may be made with satisfactory crosslinking at ranges of temperatures of between 50-200° C., 75-150° C. and below 150° C. Also, the heating time to effect crosslinking may be less than 24 hours, less than 12 hours and even less than 6 hours.

By way of example and not limitation, the organic titanate catalysts may include an alkyl titanate such as Tyzor®TPT (tetra-isopropoxide titanate) catalyst, or Tyzor® TE (triethanolaminato isopropoxide titanate) catalyst, both available from E.I. duPont de Nemours and Company, Wilmington, Del., U.S.A. Another alternative is using an organic titanate catalyst which is a titanium chelate. An example of such an organic titanate catalyst which may be used is Vertec™ VEXP0504, sold by Johnson Matthey Catalysts of Chicago, Ill., U.S.A.

A crosslinked polyimide membrane is also described which includes crosslinked chains of polyimides which are imbibed with titanate. The membrane is made by forming a monoesterified membrane from a monoesterified polyimide polymer. The monoesterified membrane is subjected to transesterification conditions to form the crosslinked polyimide membrane. The monoesterified membrane is imbibed with an organic titanate catalyst, either when the membrane is being formed into its solid state or thereafter but prior to esterification of the polyimide chains in the polyimide polymer membrane. Ideally, the monoesterified polyimide polymer is spun into a hollow fiber membrane, imbibed with the organic titanate catalyst, and then esterified to form a crosslinked hollow fiber polyimide membrane.

Also, disclosed is a method of using the crosslinked polyimide membrane to separate fluids in a fluid mixture. The steps include:
(a) providing a feed stream selected from the group consisting of air, natural gas, a mixture of methane and nitrogen, a mixture of methane and hydrogen, a refinery stream, a mixture of carbon dioxide and methane, and syngas, the feed stream including a gaseous component selected from the group consisting of nitrogen, oxygen, hydrogen, hydrogen sulfide and carbon dioxide;
(b) maintaining a pressure differential between an upstream side of the membrane and a downstream side of the membrane;
(c) contacting the upstream side of the membrane with the feed stream at a pressure between about 20 psia and about 4000 psia;
(d) isolating a permeate stream on the downstream side of the membrane having a larger mole fraction of the faster permeating component than the feed stream; and
(e) isolating a retentate stream having a smaller mole fraction of the faster permeating component than the feed stream.
In one particular embodiment, the feed stream comprises carbon dioxide and methane and the faster permeating component is carbon dioxide.

BRIEF DESCRIPTION OF THE DRAWINGS

These and other objects, features and advantages of the present invention will become better understood with regard to the following description, pending claims and accompanying drawings where:

DETAILED DESCRIPTION

Figure 1:
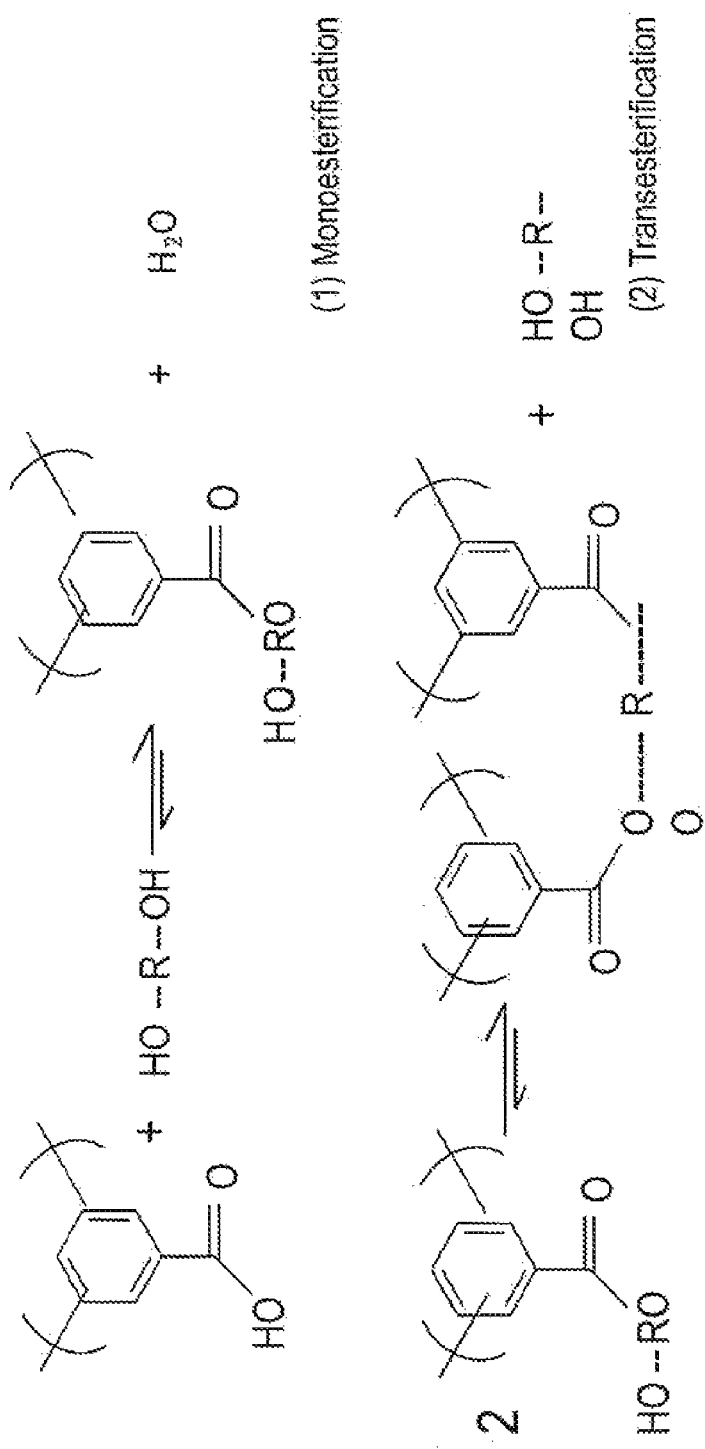
FIG. 1 shows both a monoesterification reaction and a transesterification reaction.

This invention relates to the use of organic titanate catalysts to facilitate the crosslinking of polyimide membrane materials as a method for fabricating membranes that exhibit strong resistance to plasticization-induced selectivity losses from $CO_2$ and heavy hydrocarbon exposure. The catalyst is employed to facilitate the thermal activation of crosslinking in a solid-state membrane at adequately low temperatures, i.e., 50-200° C. and at adequately short heating times, i.e., from less than 6-24 hours.

Disclosed herein is a novel method of making a crosslinked membrane utilizing a high molecular weight, monoesterified polyimide polymer. The weight average molecular weight is ideally in the range of 20,000-200,000, more preferably 80,000-160,000 and even more preferably 100,000-160,000. The test for molecular weight distribution for polyimides is determined using gel permeation chromatography based on polystyrene calibration standards.

The method includes forming crosslinkable membranes from a monoesterified, polyimide polymer. The crosslinkable membranes are imbibed with a relatively low concentrations of an organic titanate catalyst. The method further includes heating the crosslinkable membrane imbibed with the organic titanate catalyst to form a crosslinked membrane. In one embodiment, the crosslinkable membrane is a crosslinkable hollow fiber membrane and the crosslinked membrane is a crosslinked hollow fiber membrane. In another embodiment, the membrane is a film or flat sheet membrane. Furthermore, a method for using the membrane to separate fluids in a fluid mixture is disclosed.

Organic titanate catalysts are materials that include a titanium cation coordinated with various organic ligands. The reactivity and stability of a catalyst can be tuned by the structure of the ligands. Examples of such ligands include isopropyl alcohol, lactic acid/ammonium salt, acetylacetonate, etc.

One example of an organic titanate catalyst is Tyzor® TPT (tetra-isopropoxide titanate) catalyst which is an alkyl titanate available from E.I. duPont de Nemours and Company, Wilmington, Del., U.S.A. The Tyzor® TPT catalyst is highly reactive but is also susceptible to hydrolysis. Another example of an organic titanate catalyst is Tyzor® TE (triethanolaminato isopropoxide titanate) catalyst, also available from DuPont.

Yet another commercially available organic titanate catalyst is Vertec™ VEXP0504 which is a titanium chelate available for purchase from Johnson Matthey Catalysts of Chicago, Ill., U.S.A. The Vertec™ VEXP0504 catalyst is not as reactive as Tyzor® TPT catalyst but is believed to be more hydrolytically stable.

The mechanism of organic titanate catalysis is different from traditional acid catalysis, though the mechanism is not thoroughly understood. The organic titanate acts as a Lewis acid. While not wanted to be held to a particular theory, it believed that the Ti complexes with a pendant OH group and brings the nucleophilic oxygen to the carbocation (on the ester group that is being attacked by the OH oxygen). Accordingly, the reaction is believed to not just be dependent on random molecular motion, but it is facilitated by the catalyst.

Organic titanates catalysts are often more active catalysts than p-TSA. Further, at concentrations as low as 100 ppmw (parts per million by weight), the organic titanates can catalyze the transesterification crosslinking reaction at industrially relevant temperatures, such as below 200° C., 150° C. or even as low as 50° C.

Once a desired heating temperature and time of heating are selected to effect crosslinking, experiments can be conducted by varying the type and concentration of organic titanate catalyst to achieve those selected heating temperatures and heating times. Alternatively, if it is desired to use a particular catalyst, experiments can be run at various catalyst concentrations, times of heating, and temperatures.

A method of making a monoesterified, polyimide polymer as described herein comprises the following steps:

(a) preparing a polyimide polymer comprising crosslinkable carboxylic acid functional groups from a reaction solution comprising monomers and at least one solvent; and (b) treating the polyimide polymer with a diol at esterification conditions to form a monoesterified polyimide polymer.

In step (a), monomers in a reaction solution of at least one solvent polymerize into the polyimide polymer through an imidization reaction. The resultant polyimide polymer includes pendant carboxylic acid functional groups which are capable of crosslinking chains of the polyimide polymer through appropriate esterification reactions (i.e. monoesterification followed by transesterification).

In step (b), a monoesterification reaction takes place. More specifically, the carboxylic acid functional groups (—COOH) of the polyimide polymer react with hydroxyl functional groups (—OH) of the diol to provide a monoesterified polyimide polymer and water as a by-product. Each diol molecule contains two —OH groups. During monoesterification, only one of the —OH groups of each diol molecule reacts with a —COOH group. The remaining —OH groups can react with other ester groups via a transesterification reaction whereby monoesterified polyimide polymer chains are crosslinked and diol molecules are released as a by-product.

A method of making a crosslinked membrane as described herein comprises the following steps:

(a) preparing a polyimide polymer comprising pendant crosslinkable carboxylic acid functional groups from a reaction solution comprising monomers and at least one solvent;

(b) treating the polyimide polymer with a diol at esterification conditions to form a monoesterified polyimide polymer;

(c) forming a monoesterified membrane from the monoesterified polyimide polymer, the monoesterified membrane being imbibed with an organic titanate catalyst; and (d) subjecting the monoesterified membrane to transesterification conditions to form a crosslinked membrane.

During step (a), the monomers are distributed throughout the at least one solvent to form a reaction solution. In this reaction solution, the monomers link by the formation of poly(amic acid) which are then closed to imide rings in an imidization reaction to provide the polyimide polymer. During step (b), the polyimide polymer reacts with the diol in a monoesterification reaction to form the monoesterified polyimide polymer. More specifically, —COOH groups of the polyimide polymer react with one of the —OH groups in each diol molecule to provide the monoesterified polyimide polymer and water as a by-product. More specific details on the manufacture of potential crosslinkable polyimide polymers may be found in the references cited in the background section above. These references have been incorporated by reference in their entireties.

Steps (c) and (d) are directed to forming a monoesterified membrane imbibed with an organic titanate catalyst and forming, under transesterification conditions, a crosslinked membrane from the monoesterified membrane, respectively. The organic titanate catalyst may be placed in a solvent solution with the monoesterifed polymer and then the monoesterified membrane is formed into a solid state, such as with a cast sheet membrane. Alternatively, the monoesterified polymer may be placed in solvent solution and then a solid state membrane formed. This solid state membrane may then be treated with a solvent containing the organic titanate catalyst to imbibe the monoesterified membrane with the organic titanate catalyst.

In step (d), these pendant —OH groups facilitate crosslinking between chains of the monoesterified polyimide membrane by transesterification. This reaction can be activated by organic titanate catalysis.

A preferred form of membrane used to separate a mixture of fluids is a hollow fiber form. However, the membranes may take any form known in the art of membrane manufacture. By way of example, and not limitation, some other membrane shapes include spiral wound, pleated, flat sheet, or polygonal tubes. Multiple hollow fiber membrane tubes are preferred for their relatively large fluid contact area per unit volume. The contact area may be further increased by adding additional tubes or tube contours.

Method of Making a Monoesterified Polyimide Polymer
Step (a)—Imidization Reaction As stated above, step (a) involves preparing a polyimide polymer comprising crosslinkable pendant carboxylic acid functional groups from a reaction solution comprising monomers and at least one solvent. The monomers and at least one solvent are combined such that the monomers dissolve in the solvent to form the reaction solution. Thereafter, the monomers polymerize through the formation of poly(amic acid) linkages and subsequent imide bonds upon imidization to provide the polyimide polymer.

Monomers

The monomers ideally comprise between about 15 and about 25 weight percent of the reaction solution.

It is important that at least some of the monomers include carboxylic acid functional groups such that the resultant polyimide polymer comprises crosslinkable carboxylic acid functional groups. The monomers can include dianhydrides, tetracarboxylic acids, and furandiones. The monomers can further include diamino compounds such as diamino cyclic compounds and diamino aromatics. Such diamino aromatics can have more than one aromatic ring where the amino groups are on the same or different aromatic ring.

For example, the monomers can include monomers A, B, and C where

A is a dianhydride of formula (I);

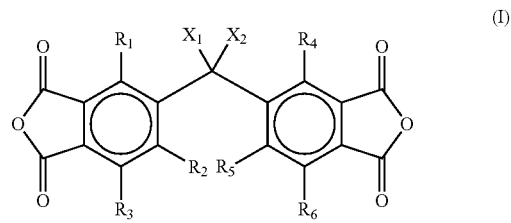

(I)

$X_1$ and $X_2$ are independently selected from halogenated alkyl, phenyl or halogen;

$R_1$, $R_2$, $R_3$, $R_4$, $R_5$, and $R_6$ are H, alkyl, or halogen;

B is a diamino cyclic compound without a carboxylic acid functionality; and

C is a diamino cyclic compound with a carboxylic acid functionality.

If the monomers are comprised of the monomers A, B, and C, the ratio of B to C can be between 1:4 and 8:1, and more preferably, between 1:2 to 4:1.

The monomer A can be 4,4'-(hexafluoroisopropylidene) diphthalic anhydride (6FDA), which is also known as (2,2-bis(3,4-dicarboxyphenyl)hexafluoropropane. 6FDA has the following formula:

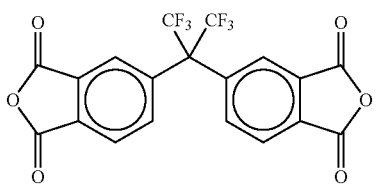

Including 6FDA in the monomers provides high gas permeability in gas separation membranes and makes the polymers solution processable.

The monomer B, a diamino cyclic compound without a carboxylic acid functionality, can be a diamino aromatic compound with more than one aromatic ring where the amino groups are on the same or different aromatic ring. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenezene, or tetramethyldiaminobenzene. The monomer B can also be 2,4,6-trimethyl-m-phenylenediamine (DAM), which is represented by the following formula:

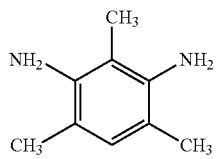

The monomer C, a diamino cyclic compound with a carboxylic acid functionality, can be diamino benzoic acid. It is represented by the following formula:

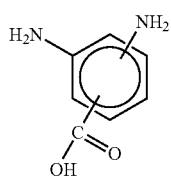

More specifically, the monomer C can be 3,5 diaminobenzoic acid (DABA).

In one embodiment of the method as described herein, the monomers include A, B, and C where A is 6FDA, B is DAM, and C is DABA. In this embodiment, the 6FDA content of the monomer mixture is about 50 mole percent and the remaining about 50 mole percent of the monomer mixture is composed of DAM and DABA. The DABA content is between about 20 percent and about 100 percent of the remaining about 50 weight percent. For example, the 6FDA content of the monomer mixture can be about 50 percent and the remaining about 50 percent can be about 40 percent DABA and about 60 percent DAM. According to an embodiment of the method as described herein, when 6FDA, DAM, and DABA are present in these stoichiometric concentrations, the polyimide polymer formed in step (a) is represented by the formula (II) where the polyimide has been monesterified by 1,3 propanediol:

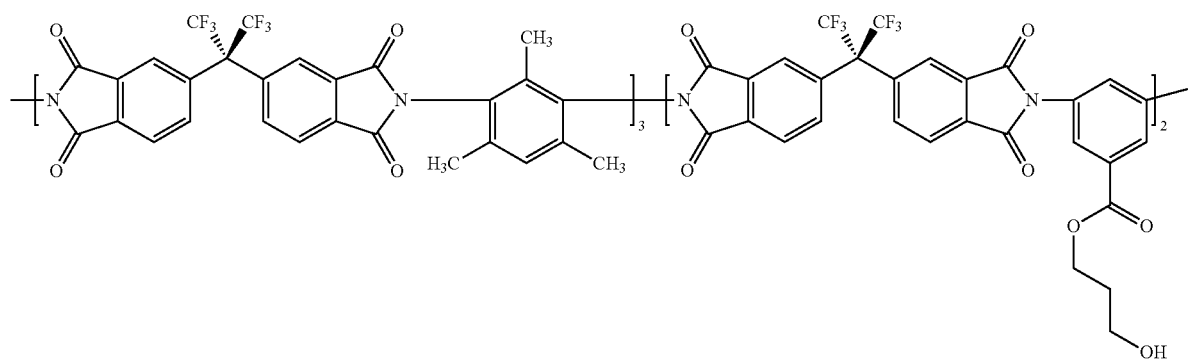

(II)

In another embodiment of the method as described herein, the monomers include A, B, and C where A is 6FDA, B is DAM, and C is DABA as well as one or more additional dianhydrides and/or diamines.

Solvents

The monomers are dissolved in at least one solvent to create a reaction solution and facilitate polymerization. The at least one solvent can comprise between about 75 and about 95 weight percent of the reaction solution. The at least one solvent in which the monomers are dissolved can be at least one high boiling polar aprotic organic solvent. Exemplary high boiling organic solvents listed in Table 1 along with their normal boiling points.

TABLE 1

| High boiling organic solvent | Normal boiling point (° C.) |
|---|---|
| N-Methyl-2-pyrrolidione (NMP) | 204 |
| Dimethyl sulfoxide (DMSO) | 190 |
| Dimethylformamide (DMF) | 153 |
| Dimethylacetamide (DMAc) | 166 |
| Diglyme | 162 |

Accordingly, the solvent of the reaction solution can be any one of the organic solvents listed above or mixtures thereof.

Imidization Conditions

In the imidization reaction, monomers react with one another forming imide rings that link the monomers together to form the polyimide polymer. The imidization reaction in step (a) occurs over an extended period of time, approximately 12-36 hours. Such an extended period of time ensures that the imidization reaction proceeds to completion, which is important with respect to yield of the polyimide polymer. The thermal imidization reaction can occur between 100-200° C., depending on the method employed.

Step (b)—Monoesterification Reaction

Step (b) involves treating the polyimide polymer with a diol at esterification conditions to form a monoesterified polyimide polymer. Thus, during step (b), the polyimide polymer is subjected to monoesterification. After the imidization reaction of step (a) is complete, the reaction solution comprises the polyimide polymer, the at least one solvent, and any unreacted monomers. The diol can be directly added to the reaction solution as a crosslinking agent to form a monoesterification reaction solution. Thus, both the imidization reaction of step (a) and the monoesterification reaction of step (b) can take place in one reaction vessel or "one pot." Alternatively, the polyimide polymer can be isolated and then combined with the diol to form a monoesterification reaction solution such that the imidization reaction of step (a) and the monoesterification reaction of step (b) take place in separate reaction vessels.

FIG. 1 schematically illustrates the monoesterification reaction. As explained above, the monoesterification reaction involves one of the —OH groups in the diol molecules reacting with the —COOH groups of the polyimide polymer to provide the monoesterified polyimide polymer. Along with the diol, an acid catalyst can also be added to the reaction solution to facilitate the monoesterification reaction.

Diol

Diols useful in the method as described herein include ethylene glycol, propylene glycol, 1,3 propanediol, 1,4 butanediol, 1,2 butanediol, benzenedimethanol, 1,3 butanediol, and mixtures thereof. In one embodiment of the method as described herein, the diol is selected from the group consisting of ethylene glycol, propylene glycol, 1,3 propanediol, benzenedimethanol, and mixtures thereof. In another embodiment, the diol is selected from the group consisting of ethylene glycol, propylene glycol, 1,3 propanediol, and mixtures thereof. In yet another embodiment, the diol is selected from the group consisting of ethylene glycol, 1,3 propanediol, and mixtures thereof. In still another embodiment, the diol is 1,3 propanediol.

Acid Catalyst

Acid catalysts useful in monoesterification reactions are well known in the art. Acid catalyst activates the carboxyl functional groups of the polyimide polymer so that they will react with the hydroxyl groups of the diol. Acid catalysts replace acid chlorides as carboxyl functional group activators. The use of acid chlorides as carboxyl functional group activators is set forth in Example 1 of U.S. Pat. No. 6,755,900, which is incorporated by reference in its entirety herein. Exemplary acid catalysts include para-toluene sulfonic acid, methane sulfonic acid, sulfuric acid, and mixtures thereof.

Monoesterification Conditions

The monoesterification reaction solution, with or without catalyst, is heated to a relatively high temperature over an extended period of time. Generally, the monoesterification reaction solution is heated for approximately 12-30 hours at a temperature between about 120° C. and about 140° C.

Method of Making a Crosslinked Membrane

Step (c)—Formation of Monoesterified Membrane Imbibed with Organic Titanate

Step (c) involves forming a monoesterified membrane from the monoesterified polyimide polymer. This monoesterified membrane can be made from a solution containing the monoesterified polyimide polymer, an organic titanate catalyst and one or more solvents. Alternatively, the organic titanate catalyst can be imbibed into the monoesterified membrane after the membrane has reached a solid state form.

The membranes may take any form known in the art, for example hollow fibers, tubular shapes, and other membrane shapes. Some other membrane shapes include spiral wound, pleated, flat sheet, or polygonal tubes. Multiple hollow fiber membrane tubes can be preferred for their relatively large fluid contact area. The contact area may be further increased by adding additional tubes or tube contours.

In one embodiment, the monoesterified membrane is a hollow fiber membrane. To make such monoesterified hollow fiber membrane, the monoesterified polyimide polymer can be incorporated into a spinning dope, which is spun into monoesterified hollow fiber by means of a spinning process such as a wet-quench/dry-jet spinning process. While a wet-quench/dry-jet spinning process is discussed below, it should be appreciated that other types of spinning methods, such as wet spinning, can be used to form the monoesterified hollow fiber.

Dry-jet/wet-quench spinning processes are well known in the art. Generally, in a dry-jet/wet-quench spinning process, a spinning dope comprising a polymer is extruded into hollow fibers through orifices of a spinneret, which is separated from a coagulating bath by a gaseous layer or non-coagulating liquid. The hollow fibers are passed through the gaseous layer, such as air, or non-coagulating liquid, such as toluene or heptane, and then immersed into a coagulating bath. The coagulating bath can be an either an aqueous system, such as pure water, or a non-aqueous system, such as methanol. Conveyance of the hollow fibers through the coagulating bath is commonly referred to as the wet-quench step. After the hollow fibers leave the coagulating bath, they can be solvent exchanged and dried.

Due to the water-sensitive nature of the more active titanates (e.g. Tyzor® TPT catalysts), the organic titanate catalysts are preferably imbibed into the skin of the asymmetric hollow fiber after quenching in the water bath. Typically hollow fibers are quenched into a water bath, followed by solvent exchange steps in methanol and hexane baths. The organic titanate catalyst is then dissolved into solution in an organic solvent. For example, if the organic titanate catalyst is soluble in hexane, it is preferable to dissolve the organic titanate catalysts in the hexane bath and imbibe it into the fiber during this solvent exchange step. The fibers are then dried to remove the organic solvent and any other residual solvents.

Step (d)—Transesterification Reaction

Step (d) involves subjecting the monoesterified fiber to transesterification conditions to form a crosslinked fiber membrane. FIG. 1 schematically illustrates the transesterification reaction. In the transesterification reaction, the remaining —OH groups in the diol molecules (i.e. the —OH groups that did not participate in the reaction with —COOH groups during the monoesterification reaction of step (b)) react with the ester groups of the monoesterified polyimide polymer. The transesterification reaction crosslinks the membrane formed in step (c) to provide a crosslinked hollow fiber membrane.

Transesterification Conditions

Transesterification can be accomplished by heating the monoesterified fiber over a period of time. In one embodiment, the heating of the crosslinkable membrane is ideally carried out at temperatures between 50-200° C. In another embodiment, the heating is carried out at between 75-150° C. In yet another embodiment the heating is carried out at below 150° C. Depending on the catalyst selected and the relative concentration of the catalyst in the membrane, the period of heating may be less than 24 hours, may be between 6-12 hours, or even less than 6 hours.

Method of Using the Membranes

A mixture containing gases to be separated can be enriched by passing the gas mixture through the membrane as disclosed herein. Such gas mixture to be enriched can originate from a hydrocarbon well such as an oil or gas well including an offshore well. It is also possible to enrich a mixture of liquids to be separated by passing the liquid mixture through the membrane in pervaporation mode as disclosed herein.

For example, the crosslinked fiber membrane can be used to separate gases by:

(a) providing a feed stream selected from the group consisting of air, a mixture of methane and nitrogen, a mixture of methane and hydrogen, a refinery stream, a mixture of carbon dioxide and methane, and syngas, the feed stream including a gaseous component selected from the group consisting of nitrogen, oxygen, hydrogen, and carbon dioxide;

(b) maintaining a pressure differential between an upstream side of the membrane and a downstream side of the membrane;

(c) contacting the upstream side of the membrane with the feed stream at a pressure between about 20 psia and about 4000 psia;

(d) isolating a permeate stream on the downstream side of the membrane having a larger mole fraction of the faster permeating component than the feed stream; and (e) isolating a retentate stream having a smaller mole fraction of the faster permeating component than the feed stream.

The feed stream can be enriched in the gaseous component at a temperature between about 25° C. and 200° C. As an alternative, the feed stream can be at a pressure from about 50 psia to about 4000 psia. As another alternative, the feed stream can be at a pressure from about 200 psia to about 1000 psia. The temperature of the feed stream can be its temperature as produced from a hydrocarbon well (e.g. a oil or gas well including an offshore well). These conditions can be varied using routine experimentation depending on the feed streams. The downstream side of the membrane can be maintained at a lower pressure than the upstream feed side.

A variety of gas mixtures can be purified with the membrane as disclosed herein. For example, applications include enrichment of air by nitrogen and oxygen, carbon dioxide removal from methane streams including natural gas, nitrogen or hydrogen removal from methane streams, or carbon monoxide from syngas streams. The membrane can also be used in hydrogen separation from refinery hydroprocessing streams and other process streams, for example from the dehydrogenation reaction effluent in the catalytic dehydrogenation of paraffins. Generally, this membrane may be used in any separation process with gas mixtures involving, for example, hydrogen, nitrogen, methane, carbon dioxide, carbon monoxide, helium, and oxygen Any gases that differ in size and condensability, for example nitrogen and oxygen or carbon dioxide and methane, can be separated using the membranes described herein. In one embodiment, a gaseous mixture containing methane and carbon dioxide can be enriched in methane by a gas-phase process through the membrane. In other embodiments, the membranes can be used to purify helium, hydrogen, hydrogen sulfide, oxygen and/or nitrogen.

Membrane Evaluation

Permeability measurements of flat membrane films can be made using a manometric, or constant volume, method. Apparatus for performing permeation measurements on dense, flat polymeric films are described in O'Brien et al., J. Membrane Sci., 29, 229 1986 and Costello et al., Ind. Eng. Chem. Res., 31, 2708, 1992, the contents of which are hereby incorporated by reference. The permeation system includes a temperature-controlled chamber containing two receiver volumes for the upstream and downstream, a membrane cell, a MKS Baratron® absolute pressure transducer (0-10 torr) for the downstream, an analog or digital high pressure gauge (0-1000 psia) for the upstream, stainless steel tubing, Nupro® bellows seal valves, and Cajon VCR® metal face seal connections. The chamber temperature can be regulated for permeation measurements ranging from 25° C. to 75° C.

Figure 2:
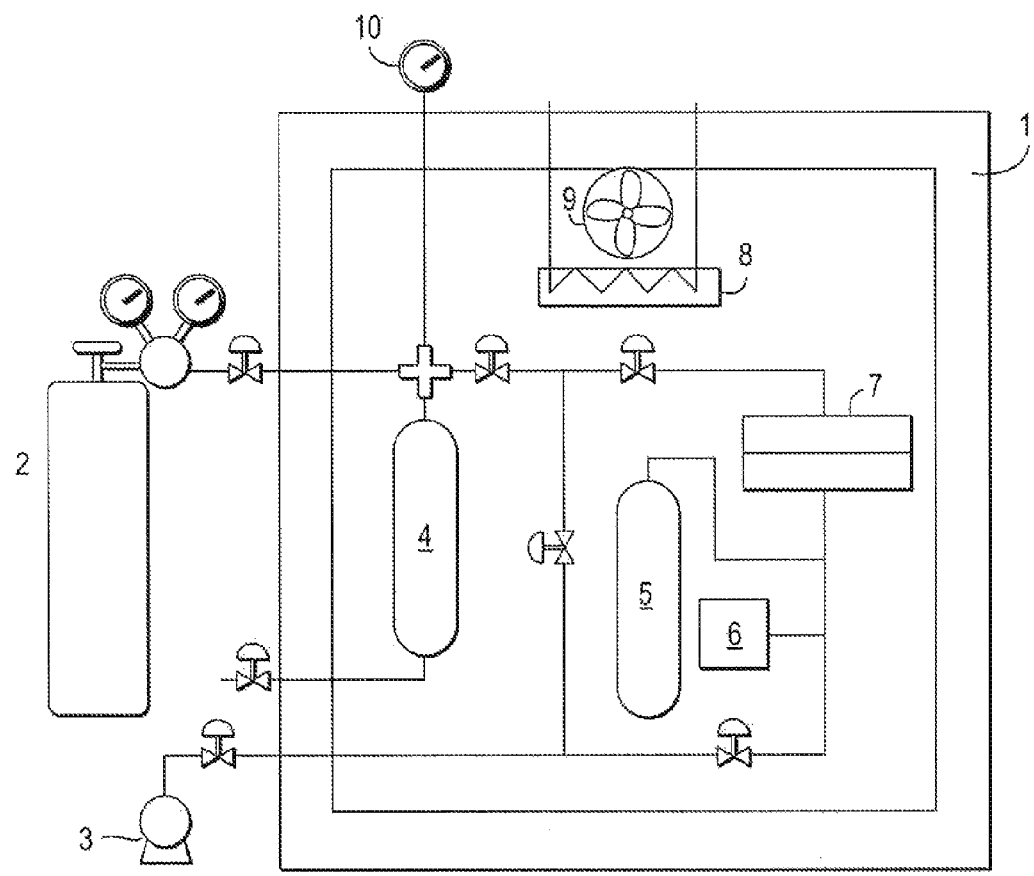
FIG. 2 shows a schematic of a gas permeation apparatus used to test flat membrane films.

The schematic of a permeation testing apparatus is shown in FIG. 2, where 1 is a heated chamber, 2 is a supply gas cylinder, 3 is a vacuum pump, 4 is the feed receiver volume, 5 is the permeate receiver volume, 6 is a pressure transducer, 7 is a membrane cell, 8 is a thermostat-controlled heater, 9 is a fan and 10 is a pressure gauge.

Flat membrane films can be masked with adhesive aluminum masks having a circular, pre-cut, exposed area for permeation through the membrane. Application of 5-minute epoxy at the interface between membrane and the aluminum mask is often necessary to prevent non-selective gas flow between the aluminum mask adhesive and membrane.

After drying the epoxy for approximately 12 to about 24 hours, the masked membrane can be placed in a permeation cell and the permeation system. Both the upstream and downstream sections of the permeation system are evacuated for about 24 hours to 48 hours to remove ("degas") any gases or vapors sorbed into the membrane and permeation system. Permeation tests of the membrane can be performed by pressurizing the upstream with the desired gas at the desired pressure. The permeation rate can be measured from the pressure rise of the MKS Baratron® pressure transducer and using the known downstream (permeate) volume. The pressure rise is captured by a data acquisition system. The membrane is exposed to a given feed condition for 24 hours before permeation measurements are recorded. Following the permeation testing of a given gas, both the upstream and downstream sections are evacuated overnight before permeation testing of the next gas. Upstream and downstream gas composition are measured with gas chromatography. Stage cuts are kept below 1% to avoid concentration polarization on the feed side.

Permeability is a measure of the membrane's intrinsic productivity and selectivity is a measure of the separation efficiency. For dense films with zero pressure on the downstream, the flux ($n_A$), normalized by the transmembrane partial pressure ($\Delta p_A$) and thickness (l) is defined as the permeability ($P_A$), $$P_A = n_A \frac{\ell}{\Delta p_A}$$

Permeability values are typically reported in Barrers $$\left(1 \text{ Barrer} = 10^{-10} \frac{cc(STP) \cdot cm}{cm^2 \cdot cm \text{ Hg} \cdot s}\right).$$

For mixed gas feeds the separation factor can be calculated from, $$\alpha_{AB} = \frac{(y_A/y_B)}{(x_A/x_B)}$$

where $x_i$ is the mole fraction of component i on the upstream side and $y_i$ is the mole fraction of component i on the downstream side, as measured by gas chromatography.

Permeation Testing of a Film

Figure 3A:
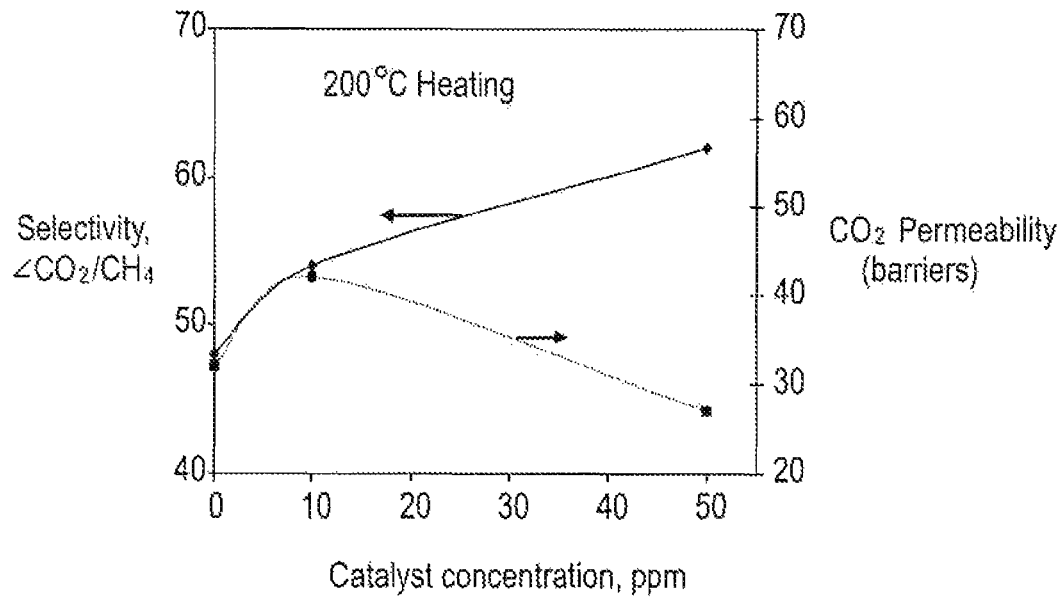
FIGS. 3(a) and 3(b) illustrate graphs of selectivity and permeability versus organic titanate catalyst (Tyzor® TPT catalyst) concentration (parts per million by weight) in crosslinked membranes which were heated, respectively, at 200° C. and 120° C. for 24 hours to activate the crosslinking of the polymer.
Figure 3B:
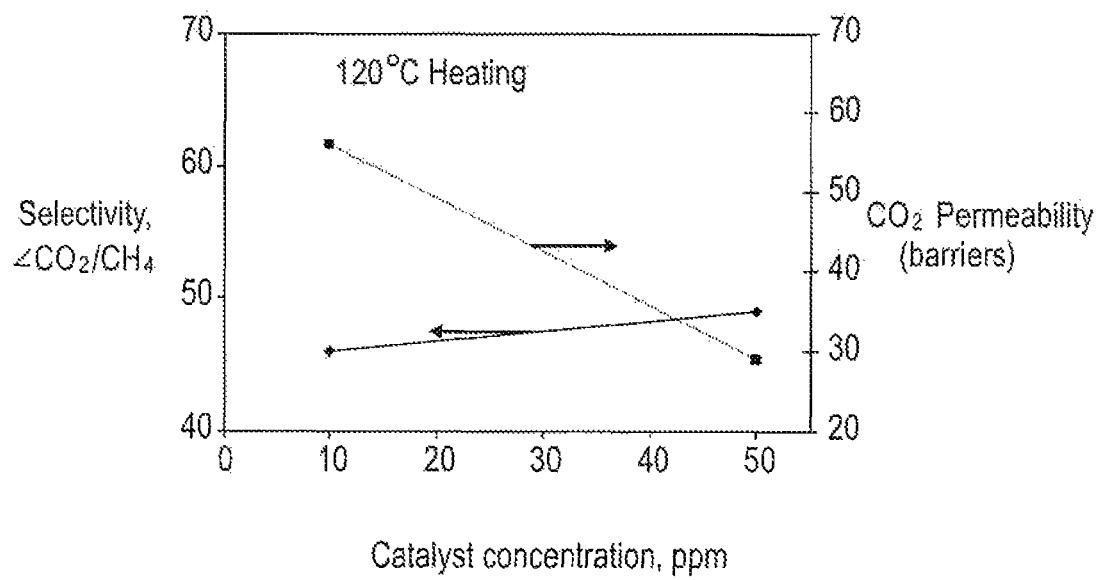

With the permeation system maintained at a constant temperature of 35° C., the flux of gases through the membrane is measured with a pressure-rise method. FIGS. 3(a) and 3(b) shows results of tests conducted on membranes made using a variety of concentrations of an organic titanate catalyst, i.e., Tyzor® TPT catalyst in this case.

Abbreviations

6FDA refers to 4,4'-(hexafluoroisopropylidene) diphthalic anhydride, which is also known as (2,2-bis(3,4-dicarboxyphenyl) hexafluoropropane.

DAM refers to 2,4,6-trimethyl-m-phenylenediamine.
DABA refers to 3,5 diaminobenzoic acid.
NMP refers to N-methyl-2-pyrrolidone.
THF refers to tetrahydrofuran.

EXAMPLE 1

Formation of Flat Sheet Membranes

Desired amounts of 6FDA-DAM:DABA 3:2 propylene glycol monoester (32PG) polymer were weighed and added to an empty vial. A known volume of THF was added to the vial containing the monoesterified polymer and the resulting composition was agitated to ensure that the polymer dissolved in the solvent. The agitation took less than an hour to have most of the polymer dissolved in the solvent. Titanate solutions were prepared in solution (ethanol for Tyzor or methanol for Vertec). Various drops of the titanate solutions were added to the polymer solution. Depending on the number of drops added, the amount of titanate to be incorporated into the polymer solution was varied. These solutions were filtered using a 0.2 μm pore size PTFE syringe filter to remove any undissolved materials.

The resulting solutions were then cast onto a Teflon disk with lips around it to stop the casting solution from dripping off the disk. Also, the disk was placed on a flat surface to reduce the possibility of variation in the thickness of the membrane.

The Teflon disk was left in a glove bag (originally saturated with THF vapor to control evaporation of the THF solvent from the casting solution) and the solvent was allowed to evaporate for 48 hours. After 48 hours of drying at room temperature, in the glove bag, the film typically peeled off the disk with little or no resistance. Heating of the film was done at the crosslinking temperature of interest (e.g. 120° C. and 200° C.) in a vacuum oven for 24 hours.

EXAMPLE 2

Permeation and Selectivity Test and Results

Sections of a defect-free membrane film from Example 1 were cut out and prepared for permeation experiments. Prior to putting a masked membrane film in the permeation cell, the exposed membrane area was measured using Scion Image software, and the film thickness measured with a micrometer (Ames). Steady-state gas permeabilities were determined at 35° C. with a constant volume, variable pressure apparatus 1. Membrane performances in terms of selectivity and permeability for two different crosslinking temperatures (120° C. and 200° C.) exposed to a feed mixture comprising 10 vol % $CO_2$ and 90 vol % $CH_4$ at 300 psia are shown in FIGS. 3(a) and 3(b).

These results of FIG. 3 should be put into context. A $CO_2$ permeability of 30 Barrers and a $CO_2/CH_4$ mixed gas selectivity of 50 is very attractive commercially if the membranes have significant plasticization resistance. For reference, cellulose acetate, the industrial standard for membranes for natural gas processing, shows a $CO_2$ permeability of 3.1 Barrers and a $CO_2/CH_4$ selectivity of 33 under similar feed conditions. See Houde A. Y., B. Krisnakumar, S. G. Charati, S. A. Stern, Permeability of dense (homogeneous) cellulose acetate membranes to methane, carbon dioxide and their mixtures at elevated pressures, *J. App. Polym. Sci.*, 1996, 62, 2181-2192.

EXAMPLE 3

Solution Reactivity of Organic Titanate Catalysts

To confirm reactivity differences of the titanates, three solutions were prepared of 0.4 g of 6FDA-DAM:DABA 3:2 propylene glycol monoester (32PG) in 15 mL of THF. Tyzor® TPT catalyst (163 ppm), Tyzor® TE catalyst (163 ppm), and p-TSA (307 ppm) were added separately to these solutions at 22° C. The polymer crosslinked and precipitated almost immediately with the addition of Tyzor® TPT catalyst and it could not be filtered through a 0.2 μm PTFE syringe filter. The Tyzor® TE catalyst caused slight phase separation, but the solution could still be filtered, albeit with difficulty. The p-TSA solution remained homogeneous (no phase separation). Accordingly, the Tyzor® TPT and Tyzor® TE catalysts were more active than p-TSA. Furthermore, Tyzor® TPT catalyst was more active than Tyzor® TE catalyst.

EXAMPLE 4

Solid-State Reactivity

The organic titanate catalyst needs to activate the solid-state crosslinking reaction with the catalyst. This reaction has been evaluated by varying the Tyzor® TPT catalyst concentration in the 32PG (6FDA-DAM:DABA 3:2) and 12PG (6FDA-DAM:DABA 1:2) monoester polyimides and heating the films (cast from THF) at various temperatures for 24 hours. Films were made by preparing Tyzor® TPT catalyst solutions in isopropyl alcohol and Vertec™VEXP0504 catalyst solutions in methanol. A few drops of these solutions were added to the polymer solution in THF, and this mixed solution was filtered and cast onto Teflon dishes. After evaporation of the THF, the films were dried under vacuum for 24 hours at various temperatures to estimate the degree of crosslinking Specific conclusions from these experiments include: Films containing 100 ppm Tyzor® TPT and 100 ppm Vertec™ VEXP504 are fully soluble in THF if the films are dried or heated at 120° C. but essentially insoluble heated at 150° C. Films made using no organic titanate catalyst heated at 150° C. are fully soluble, but these films become insoluble when treated at 200° C. At 130° C. heating, 50 ppm Tyzor® TPT catalyst produces a more solvent-resistant film than 10 ppm Tyzor® TPT catalyst.

EXAMPLE 5

Spinning of Crosslinked Defect Free Asymmetric Hollow Fiber

A spinning solution (dope) containing polyimide, N-methyl-2-pyrilodinone (NMP), ethanol, is mixed to form a homogenous solution. The polyimide is 6FDA-DAM:DABA 3:2 monoesterified with 1,3 propanediol. The dope is rolled in a sealed container for 5 days to ensure complete mixing. The dope is then allowed to degas for 24 hours before being poured into an ISCO® syringe pump, where it is again degassed for 24 hours.

The dope is extruded from an annular spinneret at 0.8 mL/min through an air gap into a quench bath filled with deionized water and taken up on a rotating drum at between 14 and 16 m/min. A solution consisting of 90% NMP with 10% water is used as the bore fluid. The fibers are kept wetted with deionized water while on the take-up drum. The fibers are cut from the drum with a razor to lengths of one meter and washed in deionized water for 24 hours.

After washing in water, the fibers are washed in baths of ethanol (2×30 min) and hexane (2×30 min). Finally, the organic titanate catalyst, preferably Tyzor® TPT catalyst, is added to a suitable organic solvent. This solvent should maintain the fiber morphology and imbibe the organic titanate catalyst into the hollow fiber membrane.

The titanate containing fibers are allowed to air dry for 30 minutes and then dried under vacuum at 120° C. for one hour.

The hollow fibers may then be crosslinked by exposure to 150° C. for approximately 6 hours under vacuum. The fibers may then be potted into modules and tested for permeation properties.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method of making a crosslinked polyimide membrane, comprising:
   (a) forming a monoesterified membrane from a monoesterified polyimide polymer, and
   (b) subjecting the monoesterified membrane to transesterification conditions to form a crosslinked fiber membrane;
      wherein the forming of the monoesterified membrane includes incorporating an organic titanate catalyst into the monoesterified membrane and the content of the organic titanate is present at between 10 and 50 parts per million by weight of the membrane.

2. The method of claim 1 wherein:
the monoesterified polyimide polymer and the organic titanate catalyst are placed together in a solution and then the monesterified membrane is formed.

3. The method of claim 1 wherein:
the monoesterified polyimide membrane is formed and then the organic titanate catalyst is imbibed into the monoesterified polyimide membrane.

4. The method of claim 3:
the monoesterified polyimide polymer is spun into a hollow fiber membrane and then the organic titanate catalyst is imbibed into the hollow fiber membrane.

5. The method of claim 4 wherein:
the organic titanate catalyst is dissolved in a solution which maintains the morphology of the membrane; and
the organic titanate catalyst is imbibed into the membrane.

6. The method of claim 1 wherein:
the monoesterified membrane is heated for less than 24 hours to form the crosslinked membrane.

7. The method of claim 1 wherein:
the monoesterified membrane is heated for less than 12 hours to form the crosslinked fiber membrane.

8. The method of claim 1 wherein:
the mono esterified membrane is heated for less than 6 hours to form the crosslinked fiber membrane.

9. The method of claim 1 wherein:
the transesterification conditions include heating the membrane at between 50-200° C.

10. The method of claim 1 wherein:
the transesterification conditions include heating the membrane at between 75-150° C.

11. The method of claim 1 wherein:
the transesterification conditions include heating the membrane at less than 150° C.

12. The method of claim 1, wherein:
the organic titanate catalyst is an alkyl titanate.

13. The method of claim 1, wherein:
the organic titanate catalyst is a titanium chelate.

14. A method of making a crosslinked polyimide membrane, comprising:
   (a) forming a monoesterified membrane from a monoesterified polyimide polymer, and
   (b) subjecting the monoesterified membrane to transesterification conditions to form a crosslinked fiber membrane;
      wherein the forming of the monoesterified membrane includes incorporating an organic titanate catalyst into the monoesterified membrane and the content of the organic titanate is present at less than 50 parts per million by weight of the membrane.

* * * * *